Nov. 27, 1956  H. BERARD  2,772,113
MOTORIZED CARRIER FOR MULTIPLE GOLF BAGS
Filed Nov 27, 1953  2 Sheets-Sheet 1

*INVENTOR.*
HENRY BERARD
BY
*ATTORNEY*

Nov. 27, 1956     H. BERARD     2,772,113
MOTORIZED CARRIER FOR MULTIPLE GOLF BAGS
Filed Nov 27, 1953     2 Sheets—Sheet 2
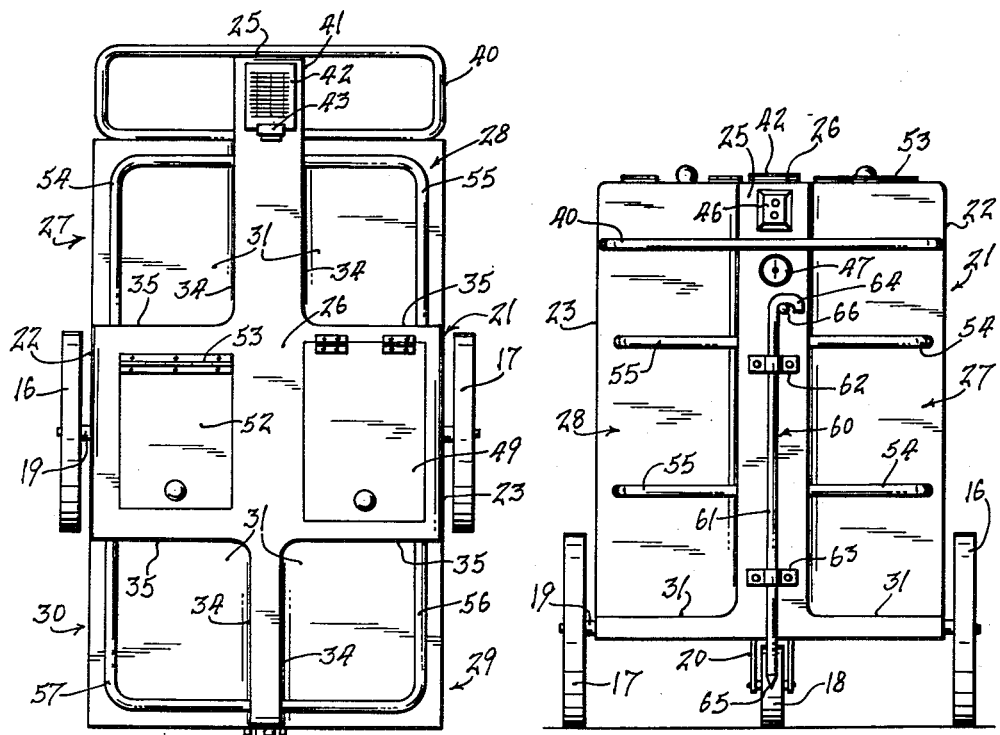
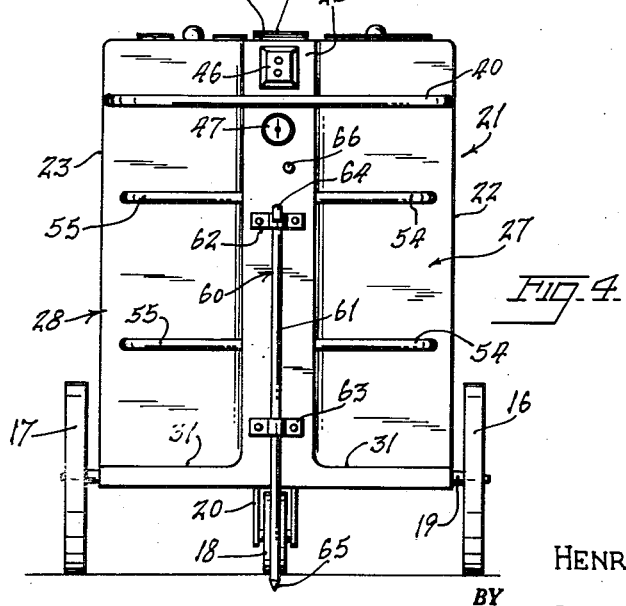
INVENTOR.
HENRY BERARD
BY
ATTORNEY

United States Patent Office 2,772,113
Patented Nov. 27, 1956

2,772,113
MOTORIZED CARRIER FOR MULTIPLE GOLF BAGS

Henry Berard, Long Island City, N. Y.

Application November 27, 1953, Serial No. 394,729

2 Claims. (Cl. 296—24)

This invention relates to new and useful improvements in caddy carts for golfers.

More particularly, the present invention proposes the construction of an improved caddy cart which can be used by an entire foursome of golfers to transport their golf clubs over a golf course so that the clubs therein are readily and conveniently disposed for use.

Another object of the present invention proposes forming the caddy cart with a battery driven electric motor so that it will be power propelled without disturbing other golfers on the links.

As a further object, the present invention proposes arranging the caddy cart with a novel brake.

The present invention further proposes constructing the caddy cart with two compartments, one for jackets, shoes and other gear, and the other an insulated compartment for carrying refreshments such as cold juices, milk, water, beer and the like or hot sandwiches and other food or drink.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 2 is a top plan view of the cart with the golf bags removed.

Fig. 3 is a rear elevational view of the cart.

Fig. 4 is a view similar to Fig. 3 but showing the brake set.

Figure 1:
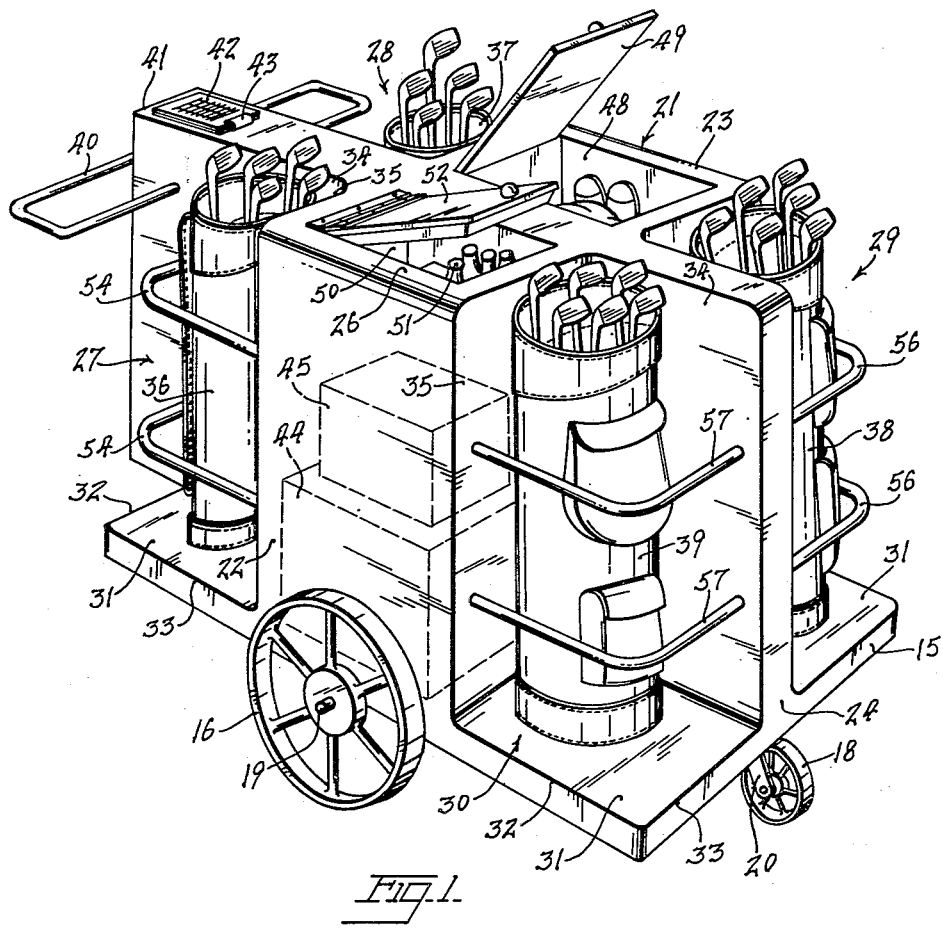
Fig. 1 is a perspective view of the caddy cart of the present invention.

Referring more particularly to the drawings, the caddy cart of the present invention has a chassis 15 with three triangularly spaced wheels 16, 17 and 18 rotatably mounted on the chassis. Wheels 16 and 17 are the same size and are mounted on an axle 19 centrally disposed or disposed to the rear of the chassis. Wheel 18 is smaller than wheels 16 and 17 and is swivelly mounted at the front of the chassis in a fork 20.

A body 21 is mounted on the chassis 15. The body in top plan view resembles a cross in form having two sides 22 and 23, a front 24, a rear or back side 25 and a top surface 26. The body 21 has also four peripheral and corner compartments 27, 28, 29 and 30. Each of these compartments has a floor 31, two open sides 32 and 33 and two closed sides 34 and 35. Each compartment is therefore adapted to receive one of the golf bags 36, 37, 38 and 39 in upright position with the bottom of the bag resting on its floor 31.

Connected to the body 21 at the rear 25 thereof is a steering handle 40 which has above it a score card holding table 41 secured to the body to hold a score card 42. A clip 43 on the table 41 prevents the score card 42 from being dislodged.

An electric motor 44 (Fig. 1) is mounted in the body 21 on the chassis 15 between the wheels and batteries 45 are similarly mounted to drive the motor 44. Motor controls 46 (Figs. 3 and 4) and instruments 47 are mounted on the rear 25 of the body 21 adjacent the steering handle 40.

Body 21 has a compartment 48 (see Figs. 1 and 2) with a hinged lid 49 disposed on the top surface 26. This compartment 48 is adapted to hold jackets, shoes and other gear of the golfers.

Body 21 also has a compartment 50 in its top surface 26 and this compartment is insulated for carrying cold drinks 51, hot sandwiches or drinks, or other refreshments in the cart. An insulated cover 25 is hinged at one side by hinge 53 to the top surface 26 to close compartment 50.

Secured to the body 21 at the corners thereof are tubular strap loops or stiff bands 54, 55, 56 and 57 (preferably of metal) which serve as golf bag holders, the golf bags being set down through the strap loops and onto the floors of the various corner compartments. The strap loops provide means to hold the golf bags in upright position in the corner compartments.

A brake 60 (Figs. 3 and 4) in the form of a spike member 61 is provided for the cart on the body 21 at the rear side 25 thereof. Spike member 61 is slidably mounted, being held to the rear side 25 by brackets 62 and 63. Spike member 61 has a handle 64 at its upper end and a sharpened point 65 at its lower end.

A stop member 66 holds the handle 64 of spike member 61 when the spike member is raised so that the brake will not inadvertently be set.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a wheeled caddy cart, a rectangular-shaped floor, an upright wall extending centrally of the floor from end to end thereof, said wall serving as a common wall for a pair of opposed compartments, substantially rectangular in cross-section, said compartments being open at the top, hinged doors closing said openings, the end walls of said compartments and the central wall defining spaces at the corners of the cart for receiving golf bags supported in upright position on the floor, and metal angle straps spaced vertically along and secured to said space-defining walls for retaining the golf bags in upright position.

2. In a motor driven caddy cart having wheels, a rectangular shaped floor supported on the wheels, an upright wall extending centrally of the floor from end to end thereof, said wall serving as a common wall for a pair of opposed compartments, substantially rectangular in cross-section, said compartments being open at the top, hinged doors closing said openings, the end walls of said compartments and the central wall defining spaces at the corners of the cart for receiving golf bags supported in upright position on the floor, metal angle straps spaced vertically along and secured to said space-defining walls for retaining the golf bags in upright position, and a spike member slidably carried on one end of said central wall for holding the cart against movement.

References Cited in the file of this patent

UNITED STATES PATENTS

D. 137,626    Adams   ---------------- Apr. 4, 1944
D. 152,249    Fox   ------------------ Jan. 4, 1949

(Other references on following page)

UNITED STATES PATENTS

| | | |
|---|---|---|
| 504,476 | Kelley | Sept. 5, 1893 |
| 1,235,973 | Heid | Aug. 7, 1917 |
| 1,475,483 | Galuska | Nov. 27, 1923 |
| 1,760,854 | Wright | May 27, 1930 |
| 2,088,200 | Glick | July 27, 1937 |
| 2,116,312 | Hollett | May 3, 1938 |
| 2,513,055 | Samuelson | June 27, 1950 |
| 2,533,549 | Bell | Dec. 12, 1950 |
| 2,586,273 | Steven | Feb. 19, 1952 |
| 2,602,676 | Fieldhouse | July 8, 1952 |

FOREIGN PATENTS

| | | |
|---|---|---|
| 475,435 | Great Britain | Nov. 19, 1937 |